US008953596B2

(12) United States Patent
Payyappilly et al.

(10) Patent No.: US 8,953,596 B2
(45) Date of Patent: Feb. 10, 2015

(54) CONSERVING NETWORK CAPACITY BY RELEASING QOS RESOURCES

(75) Inventors: Ajith T. Payyappilly, San Diego, CA (US); Sriram Nagesh Nookala, San Diego, CA (US); Vipin A. Sali, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 2458 days.

(21) Appl. No.: 11/326,760

(22) Filed: Jan. 6, 2006

(65) Prior Publication Data
US 2007/0160045 A1   Jul. 12, 2007

(51) Int. Cl.
*H04L 12/28* (2006.01)
*H04W 72/08* (2009.01)
*H04L 12/801* (2013.01)
*H04W 72/04* (2009.01)

(52) U.S. Cl.
CPC ............. *H04W 72/085* (2013.01); *H04L 47/14* (2013.01); *H04W 72/0406* (2013.01)
USPC ........................................................ 370/390

(58) Field of Classification Search
CPC ...................................................... H04L 12/56
USPC ......... 370/390, 231, 328, 464, 466, 468, 912, 370/913, 901, 902, 455, 333, 339, 320, 335, 370/477, 469, 915
See application file for complete search history.

(56) References Cited

U.S. PATENT DOCUMENTS

| | | | |
|---|---|---|---|
| 5,982,760 A * | 11/1999 | Chen | 370/335 |
| 6,445,922 B1 * | 9/2002 | Hiller et al. | 455/433 |
| 6,510,145 B1 | 1/2003 | Kim et al. | |
| 6,728,365 B1 * | 4/2004 | Li et al. | 379/329 |

(Continued)

FOREIGN PATENT DOCUMENTS

| | | |
|---|---|---|
| CN | 1488217 A | 4/2004 |
| GB | 2339645 | 1/2003 |

(Continued)

OTHER PUBLICATIONS 802.16, IEEE Standard for Local and Metropolitan Area Networks, Part 16: Air Interface for Fixed Broadband Wireless Access Systems.*

(Continued)

*Primary Examiner* — Dang Ton
*Assistant Examiner* — Nourali Mansoury
(74) *Attorney, Agent, or Firm* — Kevin T. Cheatham (57) ABSTRACT

A broadband service is provided by allocating air interface resources in a wireless network that conforms to the 1xEV-DO standard. The air interface resources are characterized by various quality of service (QoS) parameters, such as bandwidth, packet priority and error rate. Packetized information is transmitted in data flows between a base station and cell phones. A particular QoS level is reserved for each of the data flows that support the broadband service. An operating system on a cell phone monitors one data flow as well as another data flow in the opposite direction. When the base station runs out of an air interface resource, the base station suspends the QoS reservation of a data flow. The operating system determines that the QoS reservation in one direction has been suspended and sends an unsolicited message to the base station releasing the QoS reservation in the opposite direction, thereby conserving network resources.

37 Claims, 6 Drawing Sheets

(56) References Cited

U.S. PATENT DOCUMENTS

| | | | |
|---|---|---|---|
| 6,845,083 B2* | 1/2005 | Mollenkopf et al. | 370/215 |
| 6,879,581 B1* | 4/2005 | Leung | 370/352 |
| 6,987,764 B2* | 1/2006 | Hsu | 370/390 |
| 6,993,294 B2* | 1/2006 | Nobukiyo et al. | 455/67.11 |
| 7,035,259 B2* | 4/2006 | Nomura et al. | 370/392 |
| 7,072,296 B2* | 7/2006 | Turner et al. | 370/230.1 |
| 7,447,486 B2* | 11/2008 | Tamura et al. | 455/154.1 |
| 7,529,548 B2* | 5/2009 | Sebastian | 455/452.1 |
| 7,558,283 B2* | 7/2009 | Zheng | 370/437 |
| 7,603,594 B2* | 10/2009 | Inoue et al. | 714/712 |
| 8,218,573 B2 | 7/2012 | Bhushan et al. | |
| 2002/0018450 A1* | 2/2002 | McKenna et al. | 370/328 |
| 2002/0197992 A1* | 12/2002 | Nizri et al. | 455/435 |
| 2003/0031201 A1 | 2/2003 | Choi | |
| 2003/0045293 A1* | 3/2003 | Lee et al. | 455/442 |
| 2003/0063599 A1 | 4/2003 | Aggarwal et al. | |
| 2003/0078050 A1* | 4/2003 | Carlborg et al. | 455/452 |
| 2003/0086423 A1* | 5/2003 | Hsu | 370/390 |
| 2003/0133494 A1* | 7/2003 | Bender et al. | 375/130 |
| 2003/0186704 A1* | 10/2003 | Tamura et al. | 455/450 |
| 2004/0001461 A1* | 1/2004 | Lohtia et al. | 370/331 |
| 2004/0213182 A1* | 10/2004 | Huh et al. | 370/332 |
| 2004/0240424 A1 | 12/2004 | Fong et al. | |
| 2005/0190737 A1* | 9/2005 | Tanno et al. | 370/342 |
| 2005/0259690 A1* | 11/2005 | Garudadri et al. | 370/477 |
| 2006/0034481 A1* | 2/2006 | Barzegar et al. | 381/401 |
| 2007/0032241 A1* | 2/2007 | Busch et al. | 455/450 |
| 2007/0091816 A1* | 4/2007 | Lee et al. | 370/252 |
| 2007/0115896 A1* | 5/2007 | To et al. | 370/338 |
| 2007/0202904 A1* | 8/2007 | Cheng et al. | 455/509 |

FOREIGN PATENT DOCUMENTS

| | | |
|---|---|---|
| GB | 2406022 | 3/2005 |
| JP | 2000050352 A | 2/2000 |
| JP | 2003218929 A | 7/2003 |
| JP | 2003521847 A | 7/2003 |
| JP | 2005518150 A | 6/2005 |
| WO | WO0103357 | 1/2001 |
| WO | WO02069571 A2 | 9/2002 |
| WO | WO03069861 A1 | 8/2003 |

OTHER PUBLICATIONS

International Search Report—PCT/US07/060196—International Search Authority—European Patent Office—Nov. 16, 2007.

Written Opinion—PCT/US2007/060196, International Search Authority, European Patent Office Nov. 16, 2007.

3GPP2: "C S0024-A; Version 2.0; cdma2000 High Rate Packet Data Air Interface Specification; pp. 8/29-8/45 (Chapter 8.4)" Internet Citation, [Online] Jul. 2005, XP002423078 Retrieved from the Internet: URL: http://www.3gpp2.org/public_html/sp.

* cited by examiner

CONSERVING NETWORK CAPACITY BY RELEASING QOS RESOURCES

BACKGROUND

1. Field

The present disclosure relates generally wireless networks that provide high-bandwidth connections in both directions between wireless devices and base stations and, more specifically, to a method of conserving network capacity when reserved air interface resources are not being used in one direction.

2. Background

1xEV-DO (Evolution, Data Only) is a CDMA standard that modifies the 1.25 MHz IS-95 radio channel structure to provide broadband high-speed data services to wireless subscribers. The Telecommunication Industry Association has named the 1xEV-DO standard the "CDMA2000, High Rate Packet Data Air Interface Specification" and assigned it the specification number 3GPP2 C.S0024-A. 1xEV-DO and a competing standard known as W-CDMA are the two major third generation wireless standards.

Unlike traditional wireless networks that create a physical path between receiving and sending devices, an EVDO system uses Internet protocol (IP) to break up data into small pieces called packets. Packets are allowed to take different paths to the same destination. Those packets that are used to provide certain high-speed data services are prioritized. Prioritizing packets allows the EVDO system to offer a higher Quality of Service (QoS) to wireless subscribers using applications that require IP data flows with expedited forwarding. For example, the QoS used to provide a video conferencing application would be higher than the QoS used to deliver e-mail. An EVDO system ensures that certain packets will be delivered with a higher priority by reserving various IP data flows and other air interface resources for high-QoS applications.

An EVDO system is "always-on" and can provide broadband high-speed data services without complicated dialup connections. Nevertheless, bandwidth is not consumed unless packets are actually being sent. No packets are sent, for example, when an internet website is accessed and the website has not yet begun to transmit a web page, or when neither party on a voice call is speaking. Even though bandwidth is not being consumed when packets are not being sent, in a high-QoS application the air interface resources are nevertheless unavailable for use by other applications because they have been reserved.

A method is sought for making air interface resources available for other applications when those resources are not being used by the high-QoS application for which the resources were reserved.

SUMMARY

Broadband high-speed data services are provided over wireless networks that conform to the 1xEV-DO CDMA standard by allocating air interface resources between cell phones and base stations. The air interface resources are characterized by various quality of service (QoS) parameters, such as bandwidth, packet priority and error rate. Information in packets is transmitted across an EV-DO network in data flows between the cell phones and base stations. A particular QoS level is reserved for each of the data flows that support a particular broadband service. The broadband service is supported by an application running on the cell phone that uses data flows in both directions with high QoS levels.

An operating system on a cell phone monitors the various data flows received and transmitted by the cell phone. Among other things, the operating system monitors a forward data flow from the base station to the cell phone, as well as a complementary reverse data flow from the cell phone to the base station. In one embodiment, the operating system determines that the base station has temporarily suspended a QoS reservation for the forward data flow. The broadband application stops using the data flow in the reverse direction when the QoS reservation in the forward direction is suspended. The operating system recognizes that QoS is not being used in the reverse direction as the application originally requested. In response, the operating system releases the QoS reservation for the reverse data flow. The operating system temporarily suspends the QoS reservation by sending an unsolicited RequestReservationOffRev message to the base station. The base station confirms the request temporarily to suspend the QoS reservation by returning a ReservationOffRev message to the cell phone.

In another embodiment, the operating system determines that the base station has temporarily suspended a QoS reservation for the reverse data flow. Consequently, the broadband application stops using the data flow in the forward direction. The operating system recognizes that QoS is not being used in the forward direction and releases the QoS reservation for the forward data flow. The operating system temporarily suspends the QoS reservation by sending an unsolicited RequestReservationOffFwd message to the base station. The base station confirms the request temporarily to suspend the QoS reservation by returning a ReservationOffwd message to the cell phone.

In yet another embodiment, the operating system determines that the base station has permanently revoked a QoS reservation for the forward data flow. The operating system recognizes that QoS will no longer be used in the reverse direction. In response, the operating system releases the QoS reservation for the reverse data flow. The operating system permanently revokes the QoS reservation by sending an unsolicited ReservationKKQoSRequestRev message with a profile.type=0 (NULL) to the base station. The base station confirms the request permanently to revoke the QoS reservation by returning a ReservationKKQoSResponseRev message with a profile.type=0 (NULL) to the cell phone. Releasing the QoS reserved for the reverse data flow, either by temporarily suspending or by permanently revoking the QoS reservation, effectively reduces the number of data flows available to the air interface connection from the cell phone to the base station. Releasing the QoS previously reserved for the reverse data flow also conserves network resources by allowing the freed up air interface resources to be used for other connections.

In another embodiment, an analogous procedure is performed when the operating system determines that the base station has permanently revoked a QoS reservation for the reverse data flow.

Other embodiments and advantages are described in the detailed description below. This summary does not purport to define the invention. The invention is defined by the claims.

According to one example, a method operational on mobile station is provided. The mobile station may be adapted to: (a) monitor an air interface connection between the mobile station and a base station, wherein the air interface connection uses a first bandwidth in a first direction between the mobile station and the base station and a second bandwidth in an opposite direction between the mobile station and the base station, (b) determine that the base station has reduced the first bandwidth, and (c) reduce the second bandwidth in response to the determining that the base station has reduced the first bandwidth. The first direction may be from the base station to the mobile station and the opposite direction may be from the base station to the mobile station. The air interface connection may conform to a wireless specification called 1xEV-DO. In one example, the air interface connection may conform to a wireless specification called General Packet Radio Service (GPRS). The base station may have reduced the first bandwidth to a third bandwidth, wherein the first bandwidth supports an application over the air interface connection, and wherein the third bandwidth supports partial aspects of the application over the air interface connection. In one example, the second bandwidth may be reduced in (c) by reducing a number of timeslots available to the air interface connection. In another example, the second bandwidth may be reduced in (c) by reducing a number of IP flows available to the air interface connection.

According to another example, another method operational on mobile station is provided. The mobile station may be adapted to: (a) monitoring a forward data flow and a reverse data flow between an access terminal and an access network, (b) determining that a reservation of the forward data flow has been suspended, and (c) releasing a reservation of the reverse data flow in response to suspension of the forward data flow. In one example, the releasing the reservation of the reverse data flow in (c) may temporarily suspend the reservation of the reverse data flow. In another example, the releasing the reservation of the reverse data flow in (c) may permanently revoke the reservation of the reverse data flow. The forward data flow may be a flow of IP packets from the access network to the access terminal. The reverse data flow may be a flow of IP packets from the access terminal to the access network. The access terminal may determine in (b) that the access network has suspended the reservation of the forward data flow. In one example, the forward data flow may be part of a Radio Link Protocol (RLP) flow. In another example, the forward data flow is part of a Reverse Traffic Channel Medium Access Control (RTCMAC) flow. The terminal and the access network may comply with a wireless specification called 3GPP2 C.S0024. The reservation of the reverse data flow may be released in (c) by sending a generic attribute update protocol (GAUP) request attribute to the access network. The GAUP request attribute may be a ReservationKKQoSRequest with a ProfileType field set to NULL.

In yet another example, a method is provided comprising: (a) receiving a first generic attribute update protocol (GAUP) message that includes an attribute ReservationKKQoSResponse, wherein the attribute ReservationKKQoSResponse includes a ProfileType field set to NULL; and (b) sending a second GAUP message that includes an attribute ReservationKKQoSRequest in response to receiving the first GAUP message, wherein the attribute ReservationKKQoSRequest includes a ProfileType field set to NULL, wherein the attribute ReservationKKQoSResponse relates to a first IP flow in a direction between an access terminal and an access network, and the attribute ReservationKKQoSRequest relates to a second IP flow in an opposite direction between the access terminal and the access network. The direction between the access terminal and the access network may be from the access network to the access terminal, and wherein the :opposite direction is from the access terminal to the access network. The direction between the access terminal and the access network may be from the access terminal to the access network, and wherein the opposite direction is from the access network to the access terminal. Before step (a), the method further comprising: (c) receiving a third GAUP message that includes an attribute ReservationOff, wherein the attribute ReservationOff relates to the first IP flow. In one example, the first IF flow is part of a Radio Link Protocol (RLP) flow, and before step (a) the method further comprising: (c) receiving a third GAUP message that includes an attribute FlowNNReservation that removes a binding of a reservation of the RLP flow. In another example, the first IP flow is part of a Reverse Traffic Channel Medium Access Control (RTCMAC) flow and the second IP flow is part of a Radio Link Protocol (RLP) flow, and before step (a) the method further comprising: (c) receiving a third GAUP message that includes an attribute AssociatedFlowsNN that removes a binding of the RTCMAC flow to the RLP flow. The access terminal and the access network may comply with a wireless specification called 1xEV-DO.

Yet another example provides an access terminal, comprising: means for receiving a first generic attribute update protocol (GAUP) message that includes an attribute ReservationKKQoSResponse, wherein the attribute ReservationKKQoSResponse includes a ProfileType field set to NULL; and means for sending a second GAUP message that includes an attribute ReservationKKQoSRequest in response to receiving the first GAUP message, wherein the attribute ReservationKKQoSRequest includes a ProfileType field set to NULL, wherein the attribute ReservationKKQoSResponse relates to a first IP flow in a direction between the access terminal and an access network, and the attribute ReservationKKQoSRequest relates to a second IP flow in an opposite direction between the access terminal and the access network. The access terminal may comply with a wireless specification called 3GPP2 C.S0024. In one example, the direction between the access terminal and the access network is from the access network to the access terminal, and wherein the opposite direction is from the access terminal to the access network. In another example, the direction between the access terminal and the access network is from the access terminal to the access network, and wherein the opposite direction is from the access network to the access terminal.

Yet another example provides a processor-readable medium for storing instructions operable in a wireless device to: monitor .a forward. IP flow and a reverse IP flow between the wireless device and an access network; determine that a reservation of the forward IP flow has been suspended; and release a reservation of the reverse IP flow. The wireless device may comply with a wireless specification called 3GPP2 C.S0024. The forward IP flow may be a flow of IP packets from the access network to the wireless device. The reverse IP flow may be a flow of IP packets from the access network to the wireless device. The instructions may be operable in the wireless device to determine that the access network has suspended the reservation of the forward IP flow.

Yet another example provides a wireless device comprising: a microprocessor running a wireless application, wherein the wireless application uses both a forward flow of IP packets and a reverse flow of IP packets; and means for determining that a base station has suspended a reservation of the forward flow of IP packets and for releasing a reservation of the reverse flow of IP packets. The wireless application may receive the forward flow of IP packets from the base station and sends the reverse flow of IP packets to the base station. The wireless application may receive the reverse flow of IP packets from the base station and sends the forward flow of IP packets to the base station. The forward IP flow may be part of a Radio Link Protocol (RLP) flow. The forward IP flow may be part of a Reverse Traffic Channel Medium Access Control (RTCMAC) flow. The wireless device and the base station may comply with a wireless specification called 1xEV-DO.

BRIEF DESCRIPTION OF THE DRAWINGS

The accompanying drawings, where like numerals indicate like components, illustrate embodiments of the invention.

DETAILED DESCRIPTION

Reference will now be made in detail to some embodiments of the invention, examples of which are illustrated in the accompanying drawings.

Figure 1:
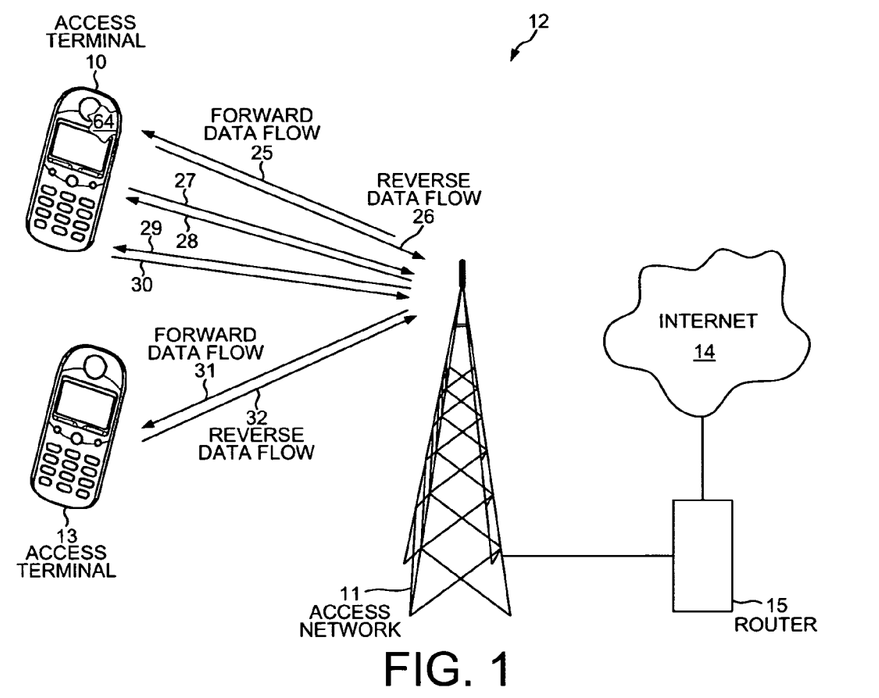
FIG. 1 is a diagram illustrating air interface resources between an access terminal and an access network in a wireless network that conforms to the 1xEV-DO standard.

FIG. 1 illustrates how air interface resources between an access terminal (AT) 10 and an access network (AN) 11 are allocated to provide a particular level of quality of service (QoS) in a wireless network 12 that conforms to the 1xEV-DO (Revision A) standard. The air interface resources are specified in the IS-856A standard that is associated with the 1xEV-DO standard. A second QoS level is provided to a second AT 13. In one embodiment, AN 11 is a base station, and AT 10 and AT 13 are both mobile stations (also called cell phones). In other embodiments, AT 10 and AT 13 are wirelessly connected laptop computers or personal digital assistants (PDAs). AN 11 is connected to the Internet 14 via a router 15. Wireless network 12 is a "data only" network in which all voice and data information is conveyed in packets from Internet 14 to and from the mobile stations.

In one embodiment, data is transmitted across air interface connections of wireless network 12 in internet protocol (IP) packets. The 1xEV-DO standard defines various layers of protocols over which the packetized data is transmitted. Some examples of the protocol layers include: a reverse traffic channel medium access control (RTCMAC) layer, a radio link protocol (RLP) layer, a point-to-point protocol (PPP) layer, an IP layer, a transmission control protocol (TCP) layer, and a user datagram protocol (UDP) layer. The radio link protocol (RLP) provides one or more octet streams with an acceptably low erasure rate for efficient operation of higher layer protocols, for example TCP. When RLP is used as part of a multi-flow packet application (MFPA), an RLP flow carries one or more octet streams from the higher layer. For example, videotelephony applications and voice-over-IP (VoIP) applications would likely employ UDP over IP over PPP over RLP, whereas a file transfer application would likely employ TCP over IP over PPP over RLP.

Each IP packet is marked to indicate its priority. For example, a field in the IP header of certain IP packets indicates that those packets require "expedited forwarding" throughout wireless network 12. Packets with such a high priority are delivered consistently with little delay. Other lower-priority packets are transmitted with "assured forwarding." Yet other even lower priority packets are transmitted on a "best efforts" basis. The IP packets then travel in data flows over the various protocol layers. For example, multiple IP flows can travel over an RLP flow, and multiple IP flows can also travel over an RTCMAC flow.

The priority at which packets are transmitted is one characteristic of a QoS level. Another characteristic of a QoS level is the bandwidth, or number of packets that are delivered per unit of time. The error rate of the delivered packets is yet another characteristic of a QoS level. Wireless network 12 enables a wireless application that requires a high QoS level to run on AT 10.

Figure 2:
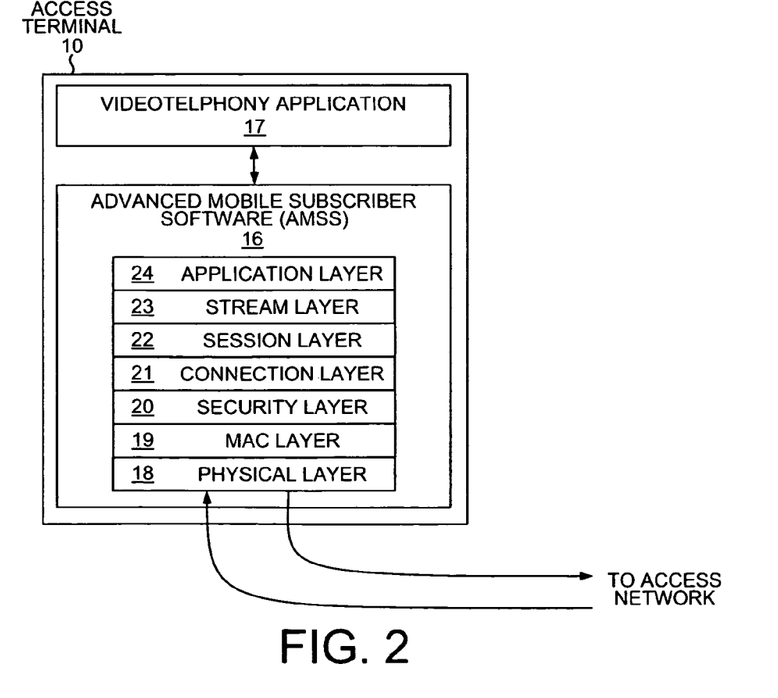
FIG. 2 is a diagram depicting an operating system and a videotelephony application running on the access terminal of FIG. 1.

FIG. 2 illustrates an operating system 16 and a videotelephony application 17 running on AT 10. In this embodiment, operating system 16 is the Advanced Mobile Subscriber Software (AMSS) produced by Qualcomm Incorporated. AMSS 16 comprises a software stack including a physical layer 18, a medium access control (MAC) layer 19, a security layer 20, a connection layer 21, a session layer 22, a stream layer 23 and an application layer 24. Videotelephony application 17 runs on top of AMSS 16 and is separate and apart from application layer 24 of AMSS 16. The RLP layer, the PPP layer, the IP layer, the TCP layer and the UDP layer are all part of application layer 24 of AMSS 16. The RTCMAC layer is part of MAC layer 19.

Provisioning QoS will now be described for videotelephony application 17 running on AT 10. In order to set up videotelephony application 17, AT 10 requests air interface resources from wireless network 12 for various QoS parameters. The requests are sent in the form of generic attribute update protocol (GAUP) messages that contain configurable attributes belonging to a multi-flow packet application (MFPA). The radio link protocol (RLP) is associated with the multi-flow packet application (MFPA). Each request can have alternative QoS requests, such as a first choice and a second choice. Wireless network 12 allocates and grants the required air interface resources for each request. Wireless network 12 can determine the appropriate resources to be allocated for each request because wireless network has knowledge about the system capabilities and available resources. The resources include not only air interface resources, but also bandwidth availability from AN 11 to router 15 and on to Internet 14, for example.

Returning to FIG. 1, six data flows 25-30 of IP packets are used to provide the videotelephony application 17. When a video conference call is initiated by videotelephony application 17, application 17 requests from AMSS 16 a video data flow, an audio data flow and a control data flow, each with the appropriate QoS. Then AMSS 16 requests the three forward data flows from AN 11 to AT 10 and the three reverse data flows from AT 10 to AN 11 that make up the video, audio and control data flows. AMSS 16 requests a forward video data flow 25 and a reverse video data flow 26. When AMSS 16 requests a reservation of a data flow with a particular QoS, the data flow is dynamically assigned a reservation label. The particular data flow is sometimes referred to as a "reservation". Various QoS parameters for each data flow are defined by fields of the GAUP attributes in each GAUP request.

In addition requesting video data flows, AMSS 16 requests a forward voice data flow 27 and a reverse voice data flow 28. Finally, a forward control data flow 29 and a reverse control data flow 30 is requested. The control data flows are used to control the other data flows. AN 11 maintains a mapping of the reserved and available air interface resources, and AN 11 can determine whether the resulting RLP flow, RTCMAC flow and QoS characteristics required for a particular requested data flow are available. Each RLP flow and RTCMAC flow can be associated with multiple data flows. Each data flow is bound to an RLP flow or an RTCMAC flow with the particular physical characteristics of the applicable QoS, such as the bandwidth, the packet priority and the error rate.

In this example, forward video data flow 25 and reverse video data flow 26 require a QoS that includes expedited forwarding of IP packets. While IP packets are being transmitted in data flow 25 and data flow 26, videotelephony application 17 is consuming significant air interface resources, including bandwidth of the allocated frequency spectrum.

In this example, a voice call is initiated by AT 13 to AN 11 during the video conference call while videotelephony application 17 running on AT 10. AT 13 requests a reservation of a forward voice data flow 31 with a particular QoS and a reverse voice data flow 32 with a particular QoS. Thereupon, AN 11 determines that the air interface resources of wireless network 12 are insufficient to provide the reserved levels of QoS for the six videotelephony data flows 25-30, as well as the two voice data flows 31-32. In this example, AN 11 chooses to make air interface resources available for the voice call between AT 13 and AN 11 by revoking some of the air interface resources reserved by AT 10 for the video conference call.

AN 11 releases the QoS reserved for forward video data flow 25 that was consuming significant bandwidth of the allocated frequency spectrum. Thus, wireless network 12 is no longer granting the bandwidth required to maintain forward video data flow 25. AN 11 uses the freed-up bandwidth to establish the air interface connection with AT 13. In addition to bandwidth, the priority and error rate resources previously consumed by forward video data flow 25 are also freed up. Without forward video data flow 25, AT 10 cannot receive video images for the video conference call. AN 11 does continue, however, to send IP packets with the voice call over reverse voice data flow 28. Instead of continuing a video conference call with video images only in one direction, video conferencing application 17 stops transmitting IP packets containing video images over reverse video data flow 26. The video conference call between AT 10 and AN 11 has been reduced to a voice call and consumed less bandwidth.

Although no IP packets are being transmitted over reverse video data flow 26, the QoS defined in the GAUP request for data flow 26 is still reserved. Wireless network 12 does not reallocated the air interface resources reserved to data flow 26 because wireless network 12 does not know whether the reserved QoS is still being used by videotelephony application 17. Until the reserved QoS for data flow 26 is released, wireless network 12 unnecessarily wastes air interface resources.

In an analogous example, AN 11 makes air interface resources available by revoking the air interface resources reserved for reverse video data flow 26. Without reverse video data flow 26, the video conference call cannot continue. Video conferencing application 17 stops receiving IP packets containing video images from forward video data flow 25, and the video conference call has been reduced to a voice call. Although no IP packets are being received from forward video data flow 25, the QoS defined in the GAUP request for data flow 25 is still reserved. Wireless network 12 does not reallocated the air interface resources reserved to data flow 25 because wireless network 12 does not know whether the reserved QoS is still being used by videotelephony application 17. Until the reserved QoS for data flow 25 is released, wireless network 12 unnecessarily wastes air interface resources.

Figure 3:
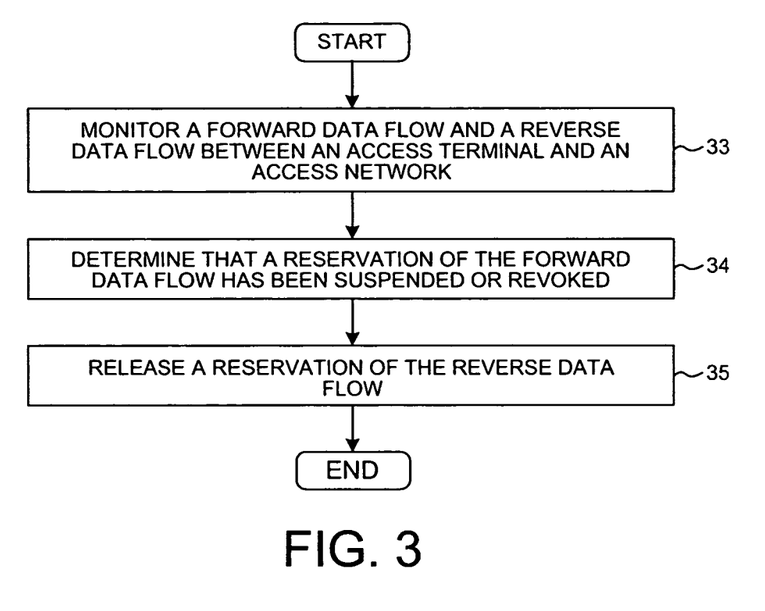
FIG. 3 is a flowchart of steps for conserving network resources when reserved air interface resources in one direction are not being used.

FIG. 3 is a flowchart of steps 33-35 for conserving network resources when reserved air interface resources in one direction are not being used. The operation of AMSS 16, as shown in FIG. 2, is explained in connection with the steps listed in FIG. 3. In a first step 33, AMSS 16 monitors the air interface connection between AT 10 and AN 11. In this example, AMSS 16 monitors the six data flows 25-30 of IP packets are used to provide videotelephony application 17.

In a step 34, AMSS 16 determines that AN 11 has reduced the bandwidth of the connection by releasing the QoS reserved for forward video data flow 25.

In response, AMSS 16 releases the QoS reserved for reverse video data flow 26 in a step 35. AMSS 16 reduces the bandwidth of the reverse video data flow 26 by requesting that the QoS reserved for reverse video data flow 26 be canceled. Releasing the QoS reserved for reverse video data flow 26 effectively reduces the number of IP flows available to the air interface connection from AT 10 to AN 11. Releasing the QoS previously reserved for reverse video data flow 26 also conserves network resources by allowing the freed up air interface resources to be used for other connections.

Steps 33-35 are equally applicable to the analogous example described above, where AMSS 16 determines in step 34 that AN 11 has released the QoS reserved for reverse video data flow 26. In step 35 in the analogous example, AMSS 16 releases the QoS reserved for forward video data flow 25.

Figure 4:
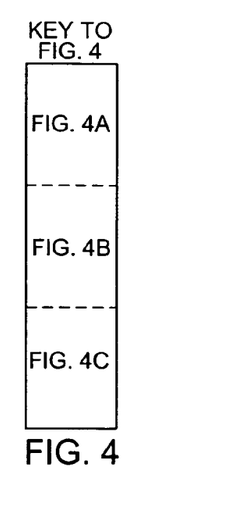
FIGS. 4A-4C are diagrams showing protocol negotiations for setting up data flows between the access terminal and access network of FIG. 1.
Figure 4A:
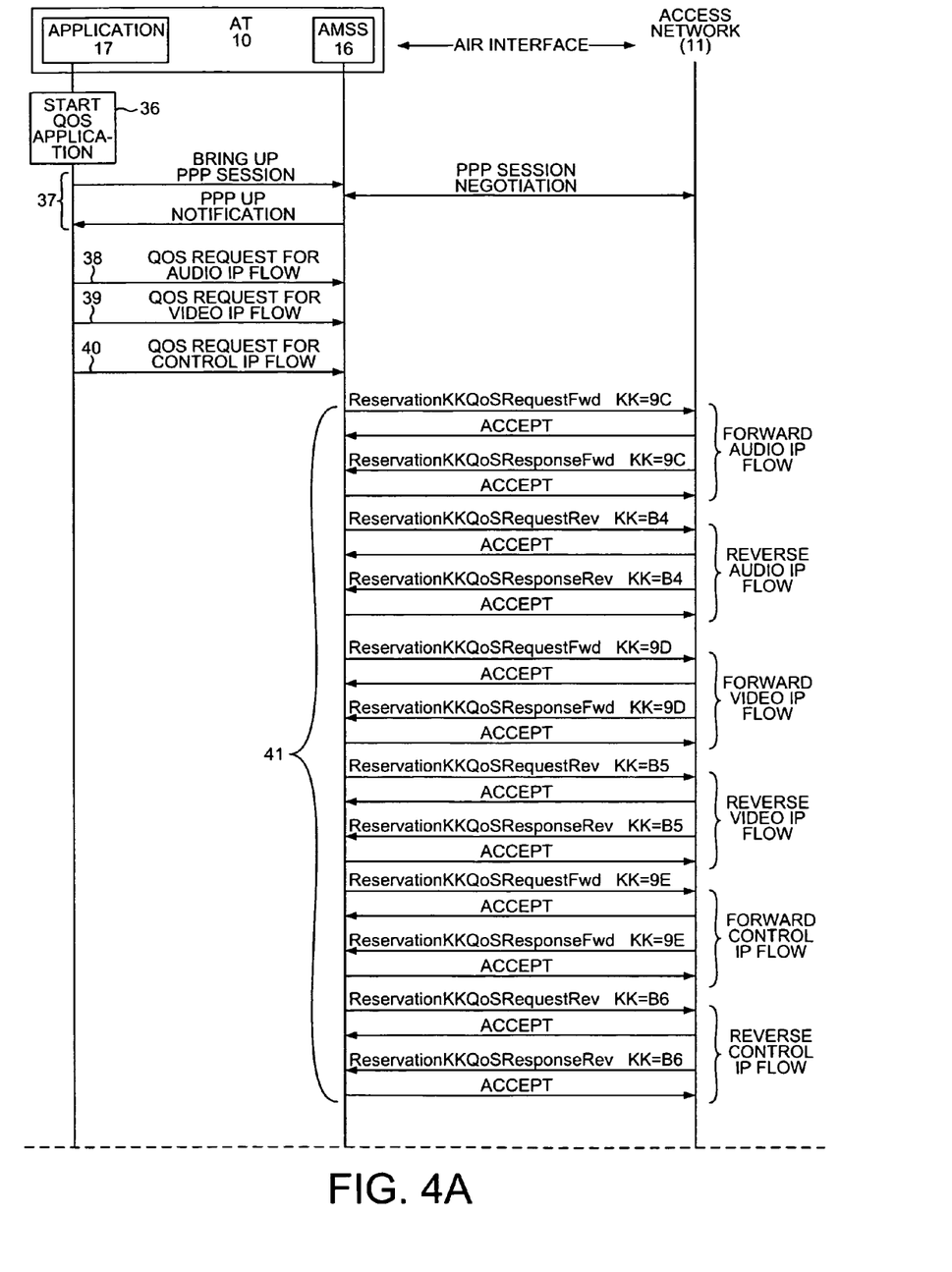
Figure 4B:
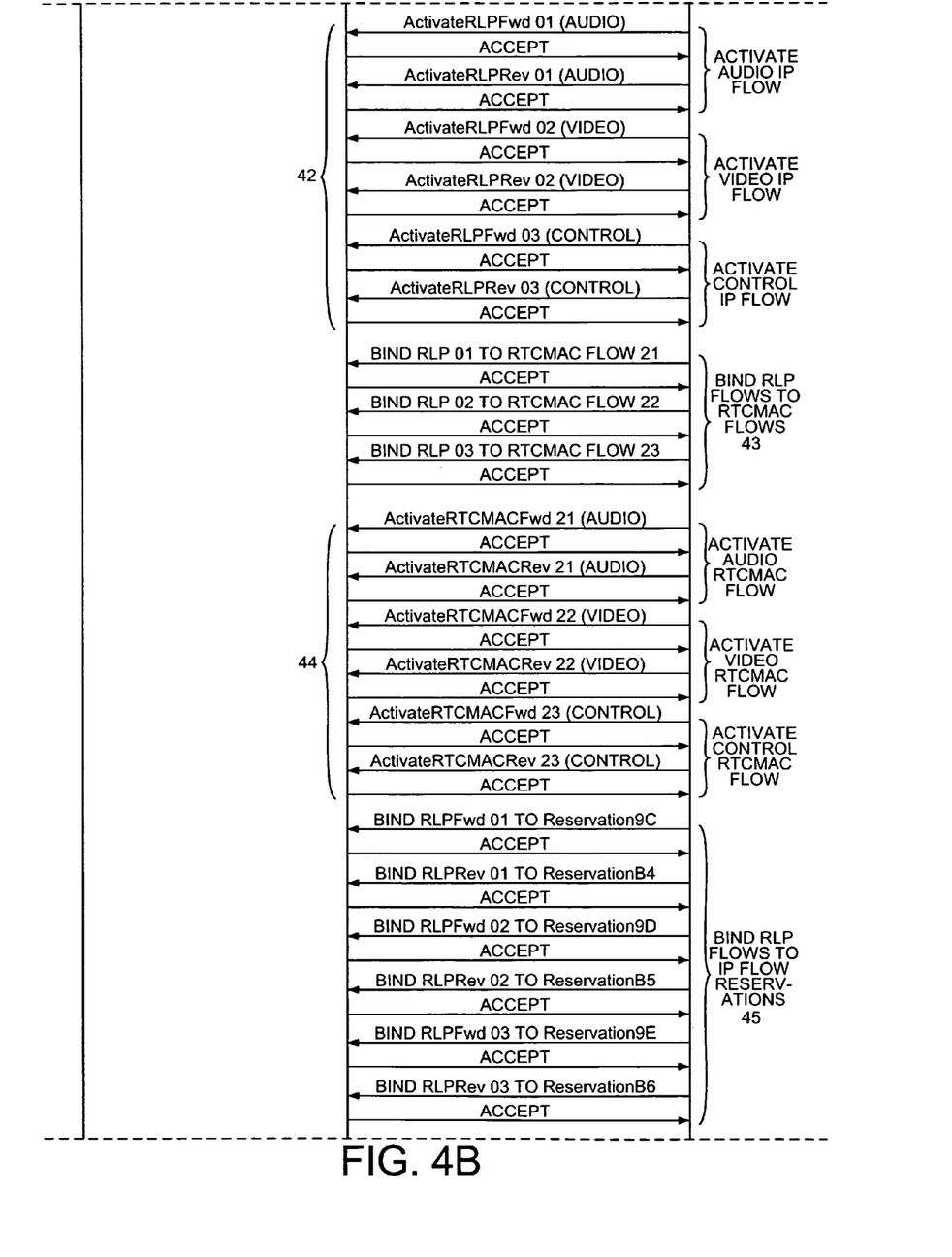
Figure 4C:
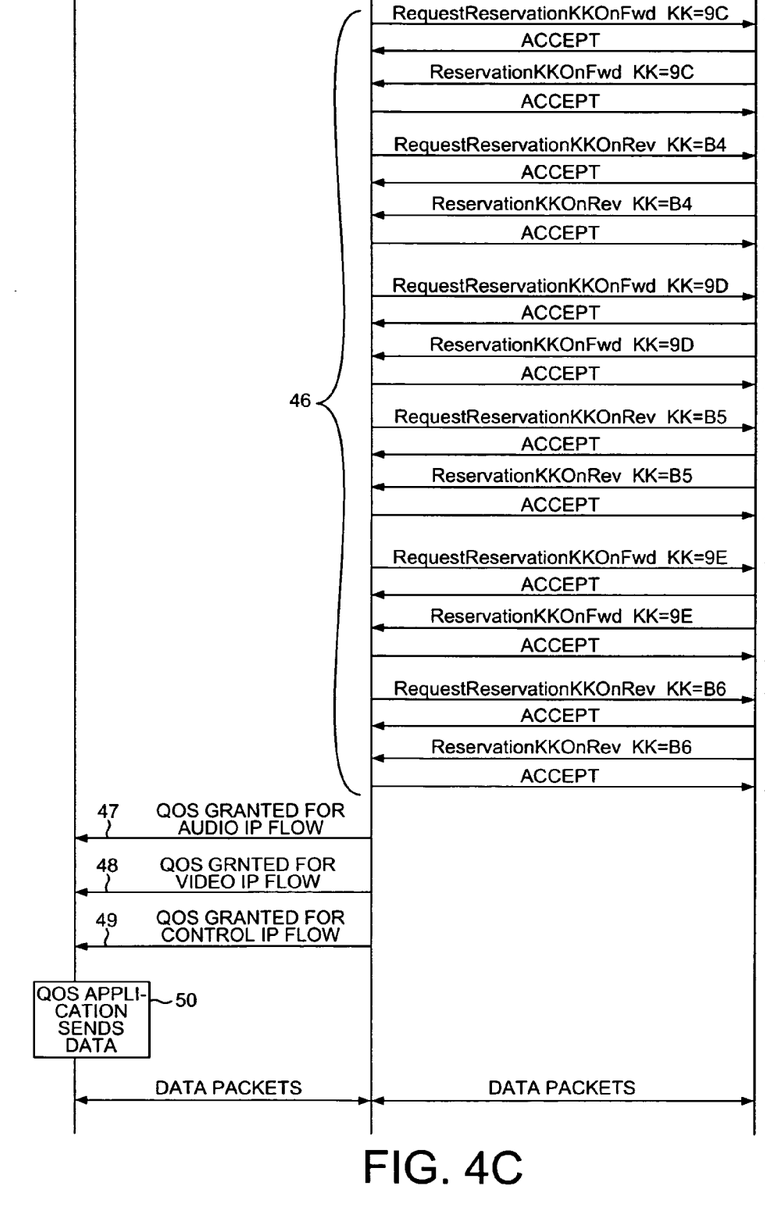

FIGS. 4A-4C illustrate in more detail how the QoS resources are set up for the six data flows 25-30 used to provide videotelephony application 17. FIG. 4A shows negotiation of protocols between videotelephony application 17 and AMSS 16, as well as between AMSS 16 and AN 11. Before the protocol negotiations shown in FIG. 4A begin, AT 10 has been powered on and has performed EV-DO session negotiations. AT 10 has requested the IS-856A protocols that provide for QoS, including Subtype 3 RTCMAC, multi-flow packet application (MFPA), Enhanced FTCMAC and Subtype 2 Physical Layer. After videotelephony application 17 is started at a step 36, AT 10 initiates negotiation of a PPP session, as shown at 37. During these negotiations, the packet switched core of wireless network 12 assigns an IP address to AT 10. Once a PPP session has been set up, videotelephony application 17 may optionally perform SIP negotiation to determine the QoS parameters, such as video rate and audio rate, that the application requires. Alternatively, videotelephony application 17 may already know the QoS requirements needed for the application.

Once videotelephony application 17 determines the required QoS parameters, videotelephony application 17 requests these parameters from AMSS 16. In this example, videotelephony application 17 makes three requests 38-40 for video IP flows, audio IP flows and control IP flows, each with the appropriate QoS characteristics.

After receiving the three requests 38-40 for QoS on various data flows, AMSS 16 generates a reservation label for each data flow with a requested QoS. In this example, 2-digit, hexadecimal reservation labels KK are assigned to six data flows: forward audio data flow 9C, reverse audio data flow B4, forward video data flow 9D, reverse video data flow B5, forward control data flow 9E, and reverse control data flow B6. The reservation labels for forward and reverse data flows are taken from different pools and may even coincide with each other.

FIG. 4 (comprising FIGS. 4A, 4B, and 4C) shows an exchange 41 of MFPA GAUP messages in which AMSS 16 requests QoS resources and AN 11 responds. AMSS 16 sends a GAUP message in the form of "ReservationKKQoSRequest" requesting QoS for each data flow over the IS-856A air interface between AT 10 and AN 11. Each GAUP message may request alternative choices of QoS. For example, a GAUP request for forward video IP flow 25 may list 64 kilobits/sec as a first choice of bandwidth and 32 kilobits/sec as the next preferred choice. In response to receiving a Reservation- KKQoSRequest, AN 11 sends a "ReservationKKQoSResponse" to AMSS 16 indicating whether AN 11 has accepted the QoS request for a data flow and, if so, which of the alternative choices were accepted.

Each GAUP message includes various fields, such as profile.type and profile.value. The profile-type field indicates how to interpret the values in the profile.value field. For example, a profile.type of "3" may indicate a verbose form of values in the profile.value field, a profile.type of "2" may indicate a shorthand form of values in the profile.value field, and a profile.type "0" (NULL) may indicate that no QoS parameters are contained in the GAUP request or GAUP response. In this example, no profile.type in the six GAUP messages is NULL.

Based on the six GAUP requests for QoS, AN 11 determines the air interface resources that will be used to grant the desired QoS. AN 11 determines the number of multi-flow RLP flows and RTCMAC flows to be established and their QoS parameters. In this example, AN 11 activates six RLP flows over which the six IP flows will flow. In an exchange 42, the six RLP flows are activated.

The RLP flows are activated by sending the GAUP messages "FlowNNIdentificationFwd" and "FlowNNIdentificationRev". The numbering NN of the RLP flows is independent of the numbering KK of the reservation labels. After the RLP flows are activated, AN 11 binds each RLP flow to an RTCMAC flow, as shown in 43. Then in an exchange 44, the AN 11 activates six RTCMAC flows over which the six IP flows will flow.

After the RLP flows and the RTCMAC flows have been activated, AN 11 informs AMSS 16 of which RLP flow to use for each IP flow that corresponds to a reservation label. AMSS 16 is informed of the correspondence between IP flows and RLP flows when AN 11 binds each IP flow to an RLP flow, as shown in 45. AN 11 binds IP flows to RLP flows with the GAUP messages "FlowNNReservationFwd" and "FlowNNReservationRev". In this embodiment, RLPFwd01 is bound to Reservation9C, for example. AN 11 also binds each RTCMAC flow to a particular RLP flow, which is not shown in FIG. 4.

After the RLP flows and the RTCMAC flows have been activated and bound, the QoS reserved in the six IP flows is ready to be turned on. To use the QoS, AMSS 16 sends a RequestReservationKKOn for each reservation label, and AN 11 responds with a ReservationKKOn for each reservation label. An exchange 46 of GAUP messages shows how the QoS in the six IP flows is turned on. AMSS 16 sends three messages 47-49 to videotelephony application 17 informing application 17 that the three QoS parameters for video IP flows, audio IP flows and control IP flows have been granted. Videotelephony application 17 begins transmitting and receiving data in a state 50. In this example, a video conference is carried between AT 10 and another subscriber on wireless network 12 by transmitting data packets in the six IP flows.

In the exchanges of GAUP messages described above, various steps are completed for all six IP flows and the associated RLP flows and RTCMAC flows before the next step is begun. For example, all RLP flows are activated before the RLP flows are bound to the IP flows. All of the steps described above, however, can be performed for a particular reservation label and associated RLP flow and RTCMAC flow before the steps are performed for another IP flow. Moreover, negotiation of the RLP flow parameters can be performed simultaneously with negotiating the RTCMAC flow parameters. In addition, multiple GAUP messages can be sent together in the same packet and can be negotiated simultaneously in order to reduce the call establishment time between beginning an application and transmitting data.

Figure 5:
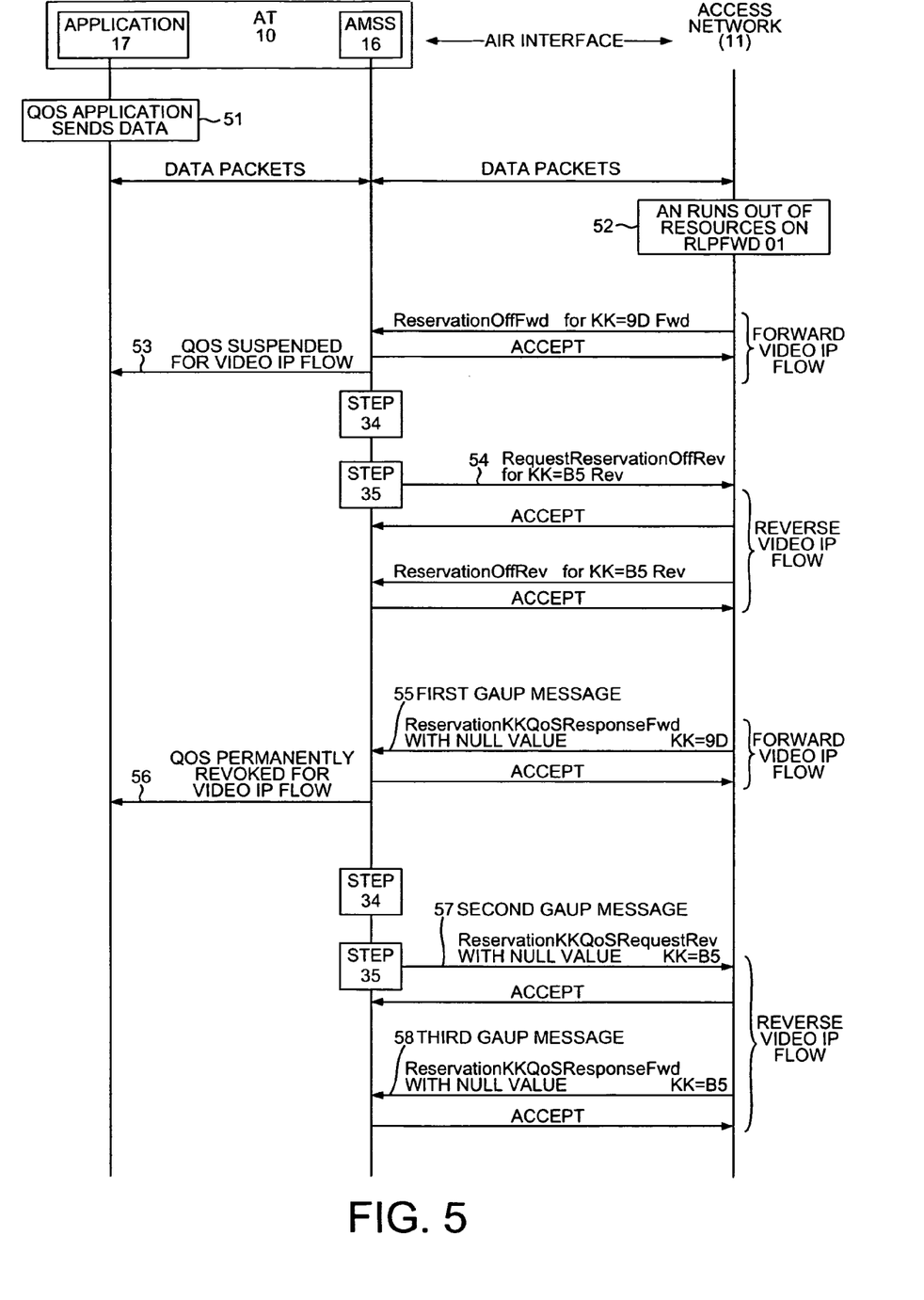
FIG. 5 is a diagram showing protocol negotiations between the access terminal and access network of FIG. 1 for performing the method of FIG. 3.

FIG. 5 shows the protocol negotiations between AMSS 16 and AN 11 that perform the method of FIG. 3. FIG. 5 begins at a state 51 with videotelephony application 17 transmitting and receiving data packets. A video conference call is taking place. In addition, AMSS 16 is performing step 33 of FIG. 3 by monitoring the air interface connection between AT 10 and AN 11, including forward video IP flow 9D and reverse video IP flow B5. AMSS 16 determines that the reserved QoS is being provided on both data flows.

Then, at the occurrence of an event 52, AN 11 runs out of a type of QoS air interface resources. In this example, AN 11 runs out of resources on forward RLP flow 01, which is mapped to reservation label 9D of the forward video IP flow. For example, AN 11 no longer has sufficient bandwidth to provide 64 kilobits/sec for reservation 9D.

Because AN 11 has run out of QoS resources for forward RLP flow 01, AN 11 sends a ReservationOffFwd message for reservation label 9D to AMSS 16. The ReservationOffFwd message indicates to AMSS 16 that the reserved QoS is being temporarily suspended for reservation label 9D. In response to receiving the ReservationOffFwd message, AMSS 16 sends a QoS Suspended notification 53 to videotelephony application 17. QoS Suspended notification 53 notifies videotelephony application 17 that QoS for video data flows has been suspended, but data flows for audio and control are still available. In this example, videotelephony application 17 converts the video conference call to a normal voice call and stops transmitting video information over reverse video data flow 26.

In step 34 of FIG. 3, AMSS 16 now determines that a reservation of QoS for forward data flow 25 (reservation 9D) has been temporarily suspended. AMSS 16 recognizes that QoS is not being used in the reverse direction as originally requested by videotelephony application 17. In response, AMSS 16 releases the reservation of QoS for reverse video data flow 26 (reservation label B5) by temporarily suspending the reservation of QoS. In step 35 of FIG. 3, AMSS 16 sends a RequestReservationOffRev message 54 that requests AN 11 temporarily to suspend QoS resources for reservation label B5. AN 11 confirms the request of AMSS 16 by sending ReservationOffRev for reservation label B5.

In this example, videotelephony application 17 continues to run, but the video conference call has been converted to a voice-only call. Data packets are transmitted only on the audio data flows and the control data flows.

If QoS resources have not become available for forward data flow 25 after the elapse of a predetermined amount of time, AN 11 permanently revokes the reservation of QoS for reservation label 9D by sending a first GAUP message 55. First GAUP message 55 is a ReservationKKQoSResponseFwd message with a profile.type=0 (NULL) and KK=9D. In response to receiving first GAUP message 55, AMSS 16 sends a QoS Permanently Revoked notification 56 to videotelephony application 17. QoS Permanently Revoked notification 56 notifies videotelephony application 17 that QoS for video data flows has been permanently revoked.

In another implementation of step 34 of FIG. 3, AMSS 16 determines from first GAUP message 55 that the reservation of QoS for forward data flow 25 has been permanently revoked. In response, AMSS 16 informs AN 11 that that the reservation of QoS for reverse video data flow 26 can be permanently revoked. In step 35 of FIG. 3, AMSS 16 sends a second GAUP message 57 that requests AN 11 permanently to revoke QoS resources for reservation label B5. Second GAUP message 57 is a ReservationKKQoSRequestRev message with a profile.type=0 (NULL) and KK=B5. AN 11 confirms the request of AMSS 16 by sending a third GAUP message 58. Third GAUP message 58 is a Reservation-KKQoSResponseRev message with a profile.type=0 (NULL) and KK=B5.

By releasing a reservation of QoS that would not be used by an application that requires complementary high-QoS data flows in both directions between a wireless device and a base station, AMSS 16 conserves air interface resources of wireless network 12. By releasing the QoS reservation associated with reservation B5, AMSS 16 frees up the bandwidth, priority and error rate resources that were not being used by videotelephony application 17, but yet remained reserved.

Although the present invention has been described in connection with certain specific embodiments for instructional purposes, the present invention is not limited thereto. For example, a method of conserving air interface resources has been described with regard to QoS resources of a wireless network that conforms to the 1xEV-DO CDMA standard. The method of conserving air interface resources also sees application in other networks. For example, the method monitors the bandwidth of the air interface connection between a mobile station and a base station in a wireless network that conforms to the General Packet Radio Service (GPRS) standard based on the Global System for Mobile communications (GSM). The air interface connection uses a first bandwidth in one direction a second bandwidth in the opposite direction. After the method determines that the base station has reduced the first bandwidth, the method conserves air interface resources by reducing the second bandwidth. The second bandwidth is reduced by reducing a number of timeslots available to the air interface connection. In one embodiment, AMSS 16 determines that a QoS reservation in a forward direction has been suspended or revoked. AMSS 16 then releases the QoS reservation in the reverse direction. In another embodiment, AMSS 16 first determines that a QoS reservation has been suspended or revoked in a reverse direction. AMSS 16 then releases the QoS reservation in the forward direction.

Operating system 16 implements the method of FIG. 3 in conjunction with a videotelephony application 17 running on a cell phone. The method of FIG. 3, however, can also be used to conserve network resources when applied to other high bandwidth applications. Examples of such other applications include voice-over-IP (VoIP) telephony, low-latency games and streaming video applications.

Although the method of FIG. 3 has been described as first determining that a reservation of a forward data flow has been revoked and then releasing a reservation of a reverse data flow, the method can be performed in on data flows of the opposite direction. For example, the method can first determine that a reservation of a reverse data flow has been revoked and then release a reservation of a forward data flow.

The previous description of the disclosed embodiments is provided to enable any person skilled in the art to make or use the present invention. Various modifications to these embodiments will be readily apparent to those skilled in the art, and the generic principles defined herein may be applied to other embodiments without departing from the spirit or scope of the invention. Accordingly, the present invention is not intended to be limited to the embodiments shown herein but is to be accorded the widest scope consistent with the principles and novel features disclosed herein.

What is claimed is:

1. A method for communication, the method comprising:
  monitoring, at a mobile station, an air interface connection between the mobile station and a base station, wherein the air interface connection supports a first bandwidth in a first direction between the base station and the mobile station and supports a second bandwidth in an opposite direction between the base station and the mobile station;
  receiving a message from the base station at the mobile station, wherein an indicator included in the message indicates that the base station has reduced the first bandwidth, and wherein the message comprises an internet protocol (IP) packet;
  reducing the second bandwidth in response to determining, at the mobile station based on the indicator, that the base station has reduced the first bandwid; and
  transmitting a second message from the mobile station to the base station, wherein a value of a particular field of the second message being a null value enables a reduction of the second bandwidth by the base station.

2. The method of claim 1, wherein the first direction is a forward direction from the base station to the mobile station.

3. The method of claim 1, wherein the opposite direction is a reverse direction from the mobile station to the base station.

4. The method of claim 1, wherein the air interface connection conforms to a wireless specification of 1xEV-DO.

5. The method of claim 1, wherein the air interface connection conforms to a wireless specification of General Packet Radio Service (GPRS).

6. The method of claim 1, wherein the first bandwidth is reduced to a third bandwidth, wherein the first bandwidth supports transmission of video data and audio data via the air interface connection, and wherein the third bandwidth supports transmission of audio data via the air interface connection.

7. The method of claim 1, wherein the second bandwidth is reduced by reducing a number of timeslots available to the air interface connection.

8. The method of claim 1, wherein the second bandwidth is reduced by reducing a number of Internet Protocol (IP) flows available to the air interface connection.

9. The method of claim 1, wherein the second message includes a second indicator indicating that the mobile station has reduced the second bandwidth.

10. The method of claim 1, further comprising receiving a third message from the base station at the mobile station, wherein a third indicator included in the third message indicates that a reduction of the first bandwidth is permanent, and wherein the third message is received a particular amount of time after receipt of the message.

11. The method of claim 1, wherein a reduction of the first bandwidth is associated with a suspension of a first video stream in the first direction.

12. The method of claim 11, wherein a reduction of the second bandwidth is associated with a suspension of a second video stream in the opposite direction.

13. The method of claim 1, wherein a videotelephony application executed by the mobile station performs a video call prior to reduction of the first bandwidth and the second bandwidth, and wherein the videotelephony application performs an audio call after reduction of the first bandwidth and the second bandwidth.

14. A method of operating an access terminal, the method comprising:
  monitoring, at the access terminal, a forward data flow and a reverse data flow between the access terminal and an access network;
  receiving a message from the access network at the access terminal, wherein an indicator included in the message indicates that a first reservation associated with the forward data flow has been suspended by the access network, and wherein the message comprises an internet protocol (IP) packet;

in response to receiving the message, determining, at the access terminal, whether the first reservation has been suspended;

releasing a second reservation associated with the reverse data flow in response to determining, based on the indicator, that the first reservation has been suspended; and transmitting a second message from the access terminal to the access network, wherein a value of a particular field of the second message being a null value enables a reduction of a bandwidth associated with the reverse data flow by the access network.

15. The method of claim 14, wherein releasing the second reservation associated with the reverse data flow temporarily suspends the second reservation associated with the reverse data flow.

16. The method of claim 14, wherein releasing the second reservation associated with the reverse data flow permanently revokes the second reservation associated with the reverse data flow.

17. The method of claim 14, wherein the forward data flow is a flow of IP packets from the access network to the access terminal.

18. The method of claim 14, wherein the reverse data flow is a flow of IP packets from the access terminal to the access network.

19. The method of claim 14, wherein the forward data flow is part of a Radio Link Protocol (RLP) flow.

20. The method of claim 14, wherein the forward data flow is part of a Reverse Traffic Channel Medium Access Control (RTCMAC) flow.

21. The method of claim 14, wherein the access terminal and the access network comply with a wireless specification of 3GPP2 C.S0024.

22. The method of claim 14, wherein the indicator is a generic attribute update protocol (GAUP) request attribute.

23. The method of claim 22, wherein, when a ProfileType field of the GAUP request attribute is set to a particular value, the GAUP request attribute indicates that the first reservation has been suspended by the access network.

24. The method of claim 14, wherein the first reservation is a quality of service (QoS) reservation of one or more parameter values associated with a priority of the forward data flow, a bandwidth of the forward data flow, an error rate of the forward data flow, or a combination thereof.

25. The method of claim 14, wherein releasing the second reservation enables the access network to reallocate air interface resources associated with the reverse data flow to other access terminals.

26. The method of claim 25, wherein the air interface resources include a priority resource, a bandwidth resource, an error rate resource, or a combination thereof, associated with the reverse data flow.

27. A non-transitory processor-readable storage medium storing instructions that, when executed by a processor, cause the processor to perform operations comprising:

monitoring, at a wireless device, a first Internet Protocol (IP) flow and an opposite IP flow between the wireless device and an access network over an air interface;

receiving a message from the access network at the wireless device, wherein an indicator included in the message indicates that a first reservation associated with the first IP flow has been suspended by the access network, and wherein the message comprises an IP packet;

in response to a determination that the first reservation has been suspended based on the indicator, releasing a second reservation associated with the opposite IP flow; and transmitting a second message from the wireless device to the access network, wherein a value of a particular field of the second message being a null value enables a reduction of a bandwidth associated with the opposite IP flow by the access network.

28. The non-transitory processor-readable storage medium of claim 27, wherein the wireless device is configured to operate in accordance with a wireless specification of 3GPP2 C.S0024.

29. The non-transitory processor-readable storage medium of claim 27, wherein the first IP flow is a forward flow of IP packets from the access network to the wireless device, and wherein the opposite IP flow is a reverse flow of IP packets from the wireless device to the access network.

30. The non-transitory processor-readable storage medium of claim 27, wherein the operations further comprise determining, at the wireless device, that the access network has suspended the first reservation.

31. A wireless device comprising:

a microprocessor configured to execute a wireless application, wherein the wireless application uses a first flow of Internet Protocol (IP) packets and an opposite flow of IP packets;

means for releasing a second reservation associated with the opposite flow of IP packets in response to determining that a base station has suspended a first reservation associated with the first flow of IP packets based on an indicator included in a message, wherein the message is received from the base station and comprises an IP packet, and wherein the indicator indicates that the base station has suspended the first reservation associated with the first flow of IP packets; and means for transmitting a second message to the base station, wherein a value of a particular field of the second message being a null value enables a reduction of a bandwidth associated with the opposite flow of IP packets by the base station.

32. The wireless device of claim 31, wherein the first flow of IP packets is a reverse flow from the wireless application to the base station, and wherein the opposite flow is a forward flow from the base station to the wireless application.

33. The wireless device of claim 31, wherein the first flow of IP packets is part of a Radio Link Protocol (RLP) flow.

34. The wireless device of claim 31, wherein the first flow of IP packets is part of a Reverse Traffic Channel Medium Access Control (RTCMAC) flow.

35. The wireless device of claim 31, wherein communications between the wireless application and the base station comply with a wireless specification of 1xEV-DO.

36. A method for communication, the method comprising:

monitoring, at a mobile station, an air interface connection between the mobile station and a base station, wherein the air interface connection supports communications in a first direction between the base station and the mobile station and in a second direction between the base station and the mobile station;

receiving, at the mobile station from the base station, a message comprising an internet protocol (IP) packet, wherein an indicator included in the message indicates that the base station has suspended a first IP flow in the first direction, the first IP flow associated with a first reservation for a first parameter value; and suspending a second IP flow in the second direction in response to determining, based on the indicator, that the base station has suspended the first IP flow, the second IP flow associated with a second reservation for a second parameter value; and further comprising prior to monitoring the air interface connection, transmitting one or more reservation messages from the mobile station to the base station, wherein the one or more reservation messages indicate parameter values associated with the first IP flow, the second IP flow, a third IP flow in the first direction, and a fourth IP flow in the second direction, wherein the parameter values include the first parameter value and the second parameter value.

37. The method of claim 36, wherein the first IP flow and the second IP flow are associated with a first data type, and wherein the third IP flow and the fourth IP flow are associated with a second data type that is distinct from the first data type.

\* \* \* \* \*